United States Patent
Chrabascz et al.

(10) Patent No.: US 9,909,594 B2
(45) Date of Patent: Mar. 6, 2018

(54) DRAIN HOLES IN RAM AIR FAN HOUSING

(71) Applicant: Hamilton Sundstrand Corporation, Windsor Locks, CT (US)

(72) Inventors: Eric Chrabascz, Longmeadow, MA (US); Craig M. Beers, Wethersfield, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 254 days.

(21) Appl. No.: 14/584,469

(22) Filed: Dec. 29, 2014

(65) Prior Publication Data

US 2016/0186780 A1   Jun. 30, 2016

(51) Int. Cl.
| | |
|---|---|
| *F04D 29/58* | (2006.01) |
| *F04D 25/06* | (2006.01) |
| *F04D 19/00* | (2006.01) |
| *B64D 13/08* | (2006.01) |
| *F04D 29/54* | (2006.01) |

(52) U.S. Cl.
CPC ......... *F04D 29/5806* (2013.01); *B64D 13/08* (2013.01); *F04D 19/00* (2013.01); *F04D 25/06* (2013.01); *F04D 29/542* (2013.01); *F05D 2260/602* (2013.01)

(58) Field of Classification Search
CPC .. F04D 19/002; F04D 29/542; F04D 29/5806; F04D 29/40; F04D 29/403; F04D 29/406; F04D 29/42; F04D 29/4206; F04D 29/4226; F04D 29/426; F04D 29/52; F04D 29/522; F04D 29/528; F01D 9/02; F01D 25/14; F01D 25/32; F05D 2240/14; F05D 2260/602; B64D 2013/0603

USPC .................................................... 415/169.2
See application file for complete search history.

(56) References Cited

U.S. PATENT DOCUMENTS

| | | | | |
|---|---|---|---|---|
| 6,460,353 | B2 | 10/2002 | Udobot et al. | |
| 6,728,480 | B1 | 4/2004 | Maeda et al. | |
| 7,342,332 | B2* | 3/2008 | McAuliffe | H02K 7/083 310/58 |
| 7,394,175 | B2* | 7/2008 | McAuliffe | H02K 1/20 310/58 |
| 8,425,660 | B2* | 4/2013 | Ike | B01D 53/261 165/59 |
| 8,459,966 | B2* | 6/2013 | Hipsky | B64D 13/00 417/325 |
| 2013/0071237 | A1 | 3/2013 | Beers et al. | |
| 2013/0097997 | A1* | 4/2013 | Chrabascz | F04D 29/541 60/226.1 |
| 2013/0098045 | A1* | 4/2013 | Binek | F04D 29/522 60/767 |

(Continued)

*Primary Examiner* — Igor Kershteyn
*Assistant Examiner* — Eric Zamora Alvarez
(74) *Attorney, Agent, or Firm* — Kinney & Lange, P.A.

(57) ABSTRACT

A ram air fan housing includes an outer cylindrical housing portion centered on a central axis, with a first end and a second end positioned axially away from the first end. The ram air fan housing also includes an inner cylindrical housing portion centered on a central axis, with a first end and a second end positioned axially away from the first end. The first end of the outer cylindrical housing portion is connected to the first end of the inner cylindrical housing portion with a disk portion. The ram air fan housing also includes a first drain hole in the outer cylindrical housing portion adjacent to the second end of the outer cylindrical housing portion.

15 Claims, 4 Drawing Sheets

(56) References Cited

U.S. PATENT DOCUMENTS

2013/0180220 A1* 7/2013 McAuliffe ............ B64D 13/00
                                                    55/385.2
2014/0056718 A1    2/2014 Beers et al.

* cited by examiner

DRAIN HOLES IN RAM AIR FAN HOUSING

BACKGROUND

The present disclosure relates to environmental control systems. More specifically, the present disclosure relates to drain holes in a ram air fan assembly for an environmental control system.

An environmental control system ("ECS") aboard an aircraft provides conditioned air to an aircraft cabin. Conditioned air is air at a temperature, pressure, and humidity desirable for aircraft passenger comfort and safety. At or near ground level, the ambient air temperature and/or humidity is often sufficiently high that the air must be cooled as part of the conditioning process before being delivered to the aircraft cabin. At flight altitude, ambient air is often far cooler than desired, but at such a low pressure that it must be compressed to an acceptable pressure as part of the conditioning process. Compressing ambient air at flight altitude heats the resulting pressurized air sufficiently that it must be cooled, even if the ambient air temperature is very low. Thus, under most conditions, heat must be removed from air by the ECS before the air is delivered to the aircraft cabin. As heat is removed from the air, it is dissipated by the ECS into a separate stream of air that flows into the ECS, across heat exchangers in the ECS, and out of the aircraft, carrying the excess heat with it. Under conditions where the aircraft is moving fast enough, the pressure of air ramming into the aircraft is sufficient to move enough air through the ECS and over the heat exchangers to remove the excess heat.

While ram air works well under normal flight conditions, at lower flight speeds, or when the aircraft is on the ground, ram air pressure is too low to provide enough air flow across the heat exchangers for sufficient heat removal from the ECS. Under these conditions, a fan within the ECS is employed to provide the necessary airflow across the ECS heat exchangers. This fan is called a ram air fan. The ram air fan includes an electric motor with a motor rotor that rotates about a shaft. The ram air fan also includes a number of associated rotating components, such as a fan rotor, to pull air into the ram air fan. The electric motor and the associated rotating components generate heat in the ram air fan that is cooled with a cooling air flowing through the ram air fan. Condensation can form in the ram air fan due to mixing of the heat from the motor and associated rotating components, the cooling air flowing through the ram air fan, and the environment in which the ram air fan is located. This condensation can cause problems with the operation of journal bearings in the ram air fan, potentially causing them to fail. This condensation can also cause failure of the electric motor. Failure of the journal bearings and/or the electric motor can cause overall failure of the ram air fan.

SUMMARY

A ram air fan housing includes an outer cylindrical housing portion centered on a central axis, with a first end and a second end positioned axially away from the first end. The ram air fan housing also includes an inner cylindrical housing portion centered on a central axis, with a first end and a second end positioned axially away from the first end. The first end of the outer cylindrical housing portion is connected to the first end of the inner cylindrical housing portion with a disk portion. The ram air fan housing also includes a first drain hole in the outer cylindrical housing portion adjacent to the second end of the outer cylindrical housing portion.

A ram air fan includes a tie rod with a first end and a second end, a motor including a rotor that rotates with the tie rod and a stator positioned radially around the rotor, and journal bearings positioned between the ran housing and the tie rod. The ram air fan also includes a fan housing positioned around the tie rod with an outer housing portion and an inner housing portion connected with a disk portion, wherein there is a first drain hole in the outer housing portion.

DETAILED DESCRIPTION

Figure 1:
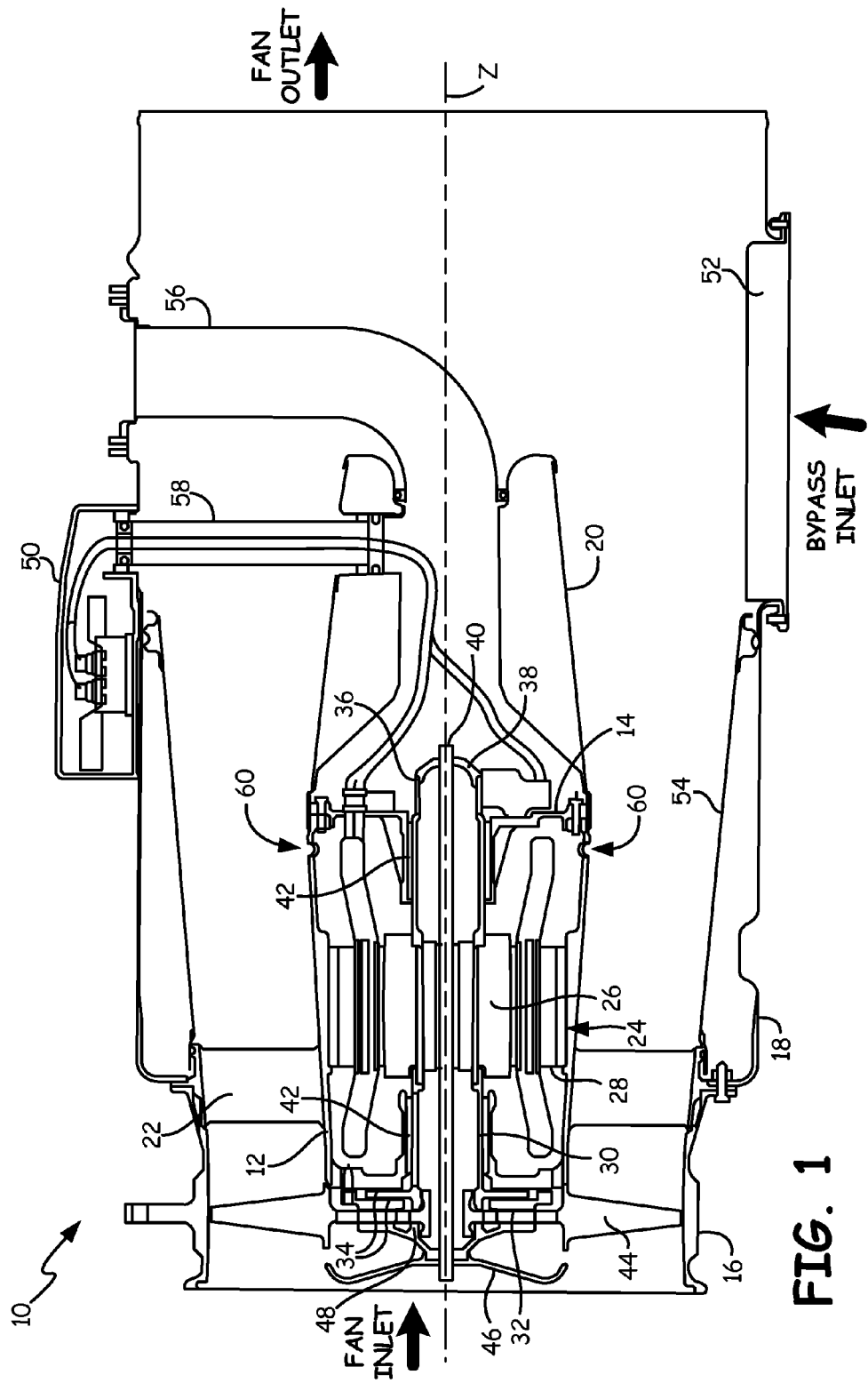
FIG. 1 is a cross-sectional view of a ram air fan assembly.

FIG. 1 is a cross-sectional view of ram air fan assembly 10. Ram air fan assembly 10 includes fan housing 12, bearing housing 14, inlet housing 16, outer housing 18, and inner housing 20. Fan housing 12 includes fan struts 22, motor 24 (including motor rotor 26 and motor stator 28), thrust shaft 30, thrust plate 32, and thrust bearings 34. Bearing housing 14 includes journal bearing shaft 36 and shaft cap 38. Fan housing 12 and bearing housing 14 together include tie rod 40 and journal bearings 42. Inlet housing 16 contains fan rotor 44, shroud 46, and hub 48, in addition to a portion of tie rod 40. Outer housing 18 includes terminal box 50 and plenum 52. Within outer housing 18 are diffuser 54, motor bearing cooling tube 56, and wire transfer tube 58. A fan inlet is a source of air to be moved by ram air fan assembly 10 in the absence of sufficient ram air pressure. A bypass inlet is a source of air that moves through ram air fan assembly 10 when sufficient ram air pressure is available. Ram air fan assembly 10 further includes drain holes 60 in fan housing 12. Axis Z extends along a central axis of ram air fan assembly 10.

As illustrated in FIG. 1, inlet housing 16 and outer housing 18 are attached to fan housing 12 at fan struts 22. Bearing housing 14 is attached to fan housing 12 and inner housing 20 connects motor bearing cooling tube 56 and wire transfer tube 58 to bearing housing 14. Motor bearing cooling tube 56 connects inner housing 20 to a source of cooling air at outer housing 18. Wire transfer tube 58 connects inner housing 20 to outer housing 18 at terminal box 50. Motor stator 28 and thrust plate 32 attach to fan housing 12. Motor rotor 26 is contained within motor stator 28 and connects journal bearing shaft 36 to thrust shaft 30. Journal bearing shaft 36, motor rotor 26, and thrust shaft 30 define an axis of rotation for ram fan assembly 10. Fan rotor 44 is attached to thrust shaft 30 with tie rod 40 extending along the axis of rotation from shaft cap 38 at the end of journal bearing shaft 36 through motor rotor 26, thrust shaft 30, and fan rotor 44 to hub 48 and shroud 46. Nuts (not shown) secure shaft cap 38 to journal bearing shaft 36 on one end of tie rod 40 and hub 48 and shroud 46 to fan rotor 44 at an opposite end of tie rod 40. Thrust plate 32 and fan housing 12 contain a flange-like portion of thrust shaft 30, with thrust bearings 34 positioned between the flange-like portion of thrust shaft 30 and thrust plate 32; and between the flange-like portion of thrust shaft 30 and fan housing 12. Journal bearings 42 are positioned between journal bearing shaft 36 and bearing housing 14; and between thrust shaft 30 and fan housing 12. Hub 48, shroud 46, fan rotor 44, and a portion of fan housing 12 are contained within inlet housing 16. Diffuser 54 is attached to an inner surface of outer housing 18. Plenum 52 is a portion of outer housing 18 that connects ram air fan assembly 10 to the bypass inlet. Inlet housing 16 is connected to the fan inlet and outer housing 18 is connected to the fan outlet.

In operation, ram air fan assembly 10 is installed into an environmental control system aboard an aircraft and connected to the fan inlet, the bypass inlet, and the fan outlet. When the aircraft does not move fast enough to generate sufficient ram air pressure to meet the cooling needs of the ECS, power is supplied to motor stator 28 by wires running from terminal box 50, through wire transfer tube 58, inner housing 20, and bearing housing 14. Energizing motor stator 28 causes rotor 24 to rotate about axis Z of ram fan assembly 10, rotating connected journal bearing shaft 36 and thrust shaft 30. Fan rotor 44, hub 48, and shroud 46 also rotate by way of their connection to thrust shaft 30. Journal bearings 42 and thrust bearings 34 provide low friction support for the rotating components. As fan rotor 44 rotates, it moves air from the fan inlet, through inlet housing 20, past fan struts 22 and into the space between fan housing 12 and outer housing 18, increasing the air pressure in outer housing 18. As the air moves through outer housing 18, it flows past diffuser 54 and inner housing 20, where the air pressure is reduced due to the shape of diffuser 54 and the shape of inner housing 20. Once past inner housing 20, the air moves out of outer housing 18 at the fan outlet.

Components within bearing housing 14 and fan housing 12, especially thrust bearings 34, journal bearings 42 and motor 24, generate significant heat and must be cooled. Cooling air is provided by motor bearing cooling tube 56 which directs a flow of cooling air to inner housing 20. Inner housing 20 directs flow of cooling air to bearing housing 14, where it flows past components in bearing housing 14 and fan housing 12, cooling bearings 32, 40 and motor components. Cooling air then exits fan housing 12 through cooling holes in fan rotor 44. Condensation can form and settle in fan housing 12 when the cooling air mixes with the heat from thrust bearings 34, journal bearings 42, and motor 24 in fan housing 12. This condensation can cause problems with the operation of journal bearings 42 and motor 24. Drain holes 60 are provided in fan housing 12 to drain the condensation out of fan housing 12 and into the air flowing through ram air fan assembly 10 and out of the fan outlet.

Figure 2:
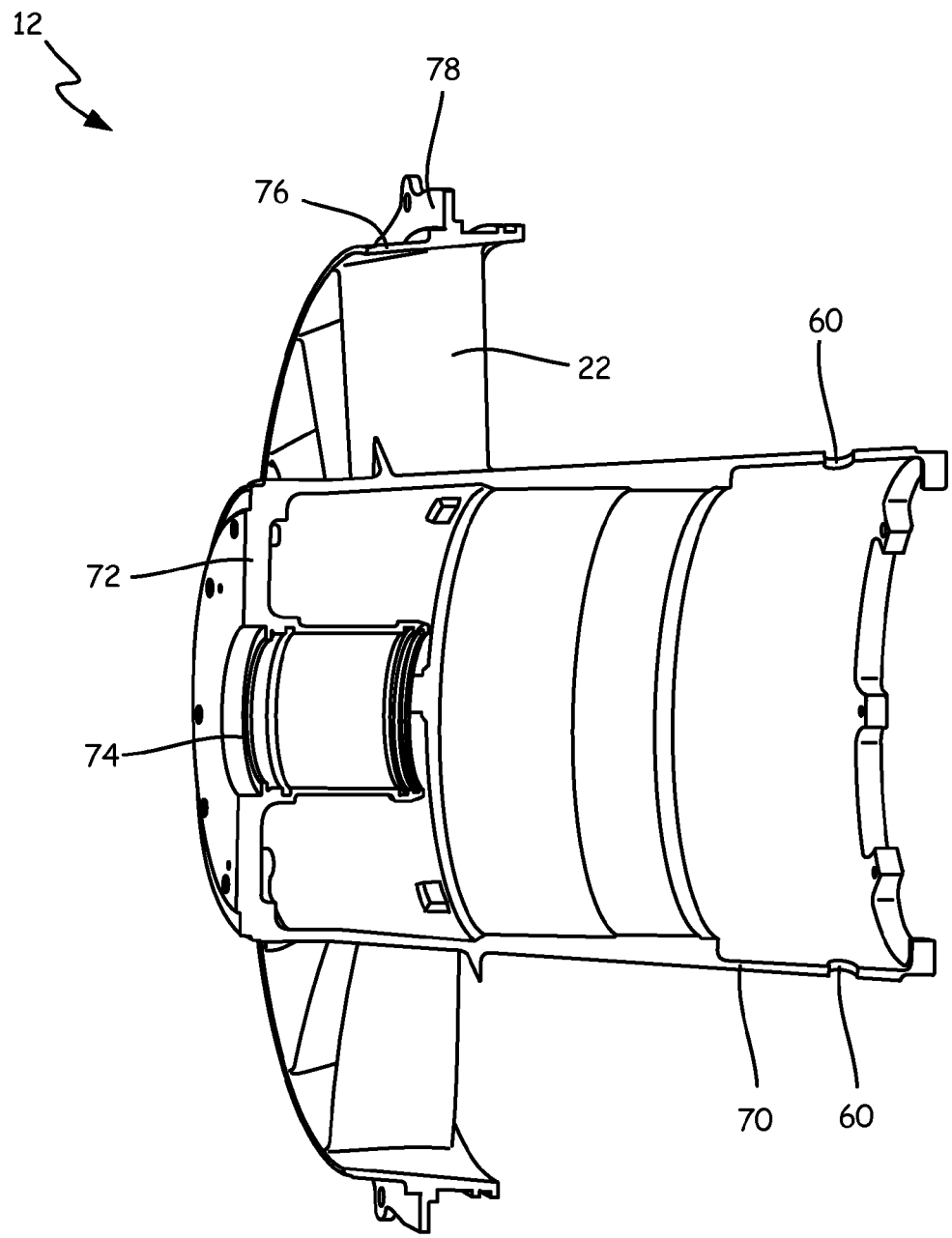
FIG. 2 is a cross-sectional view of a fan housing.
Figure 3:
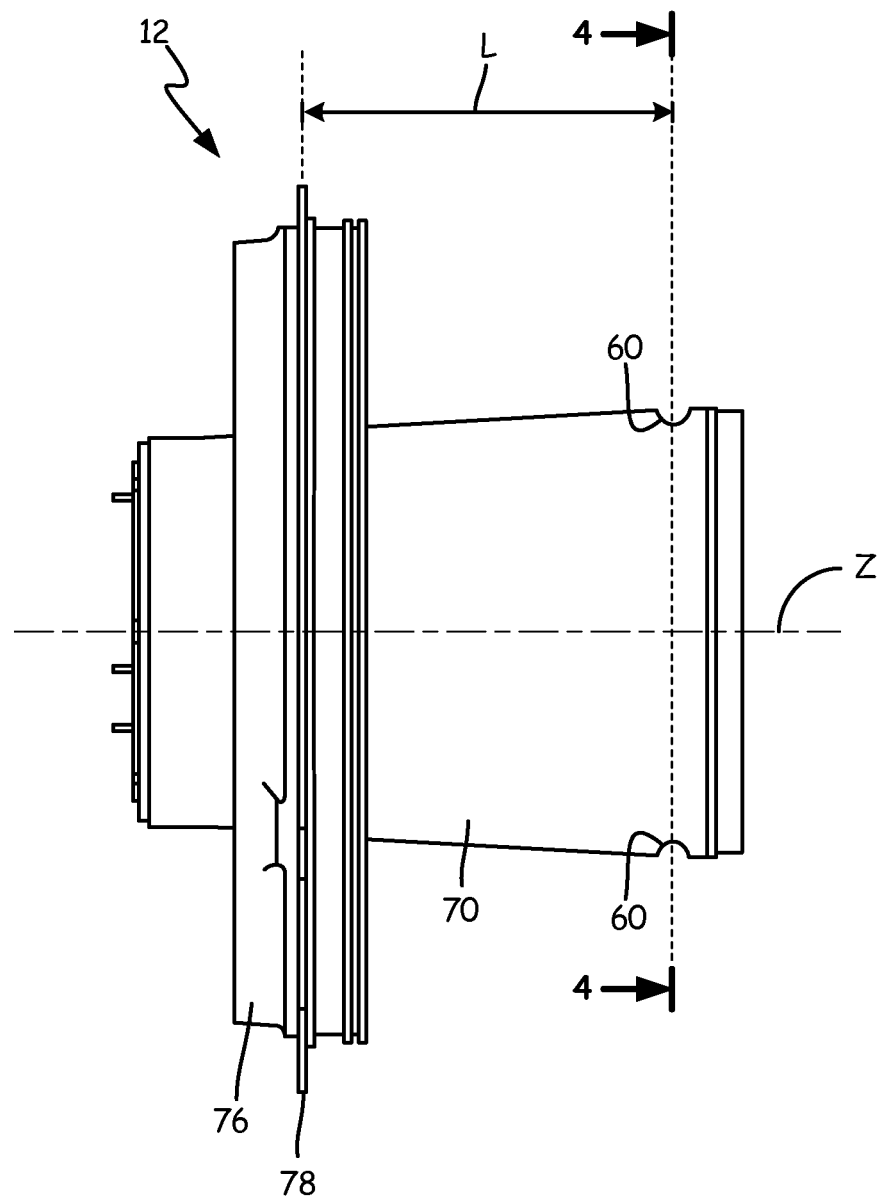
FIG. 3 is a side elevation view of the fan housing.
Figure 4:
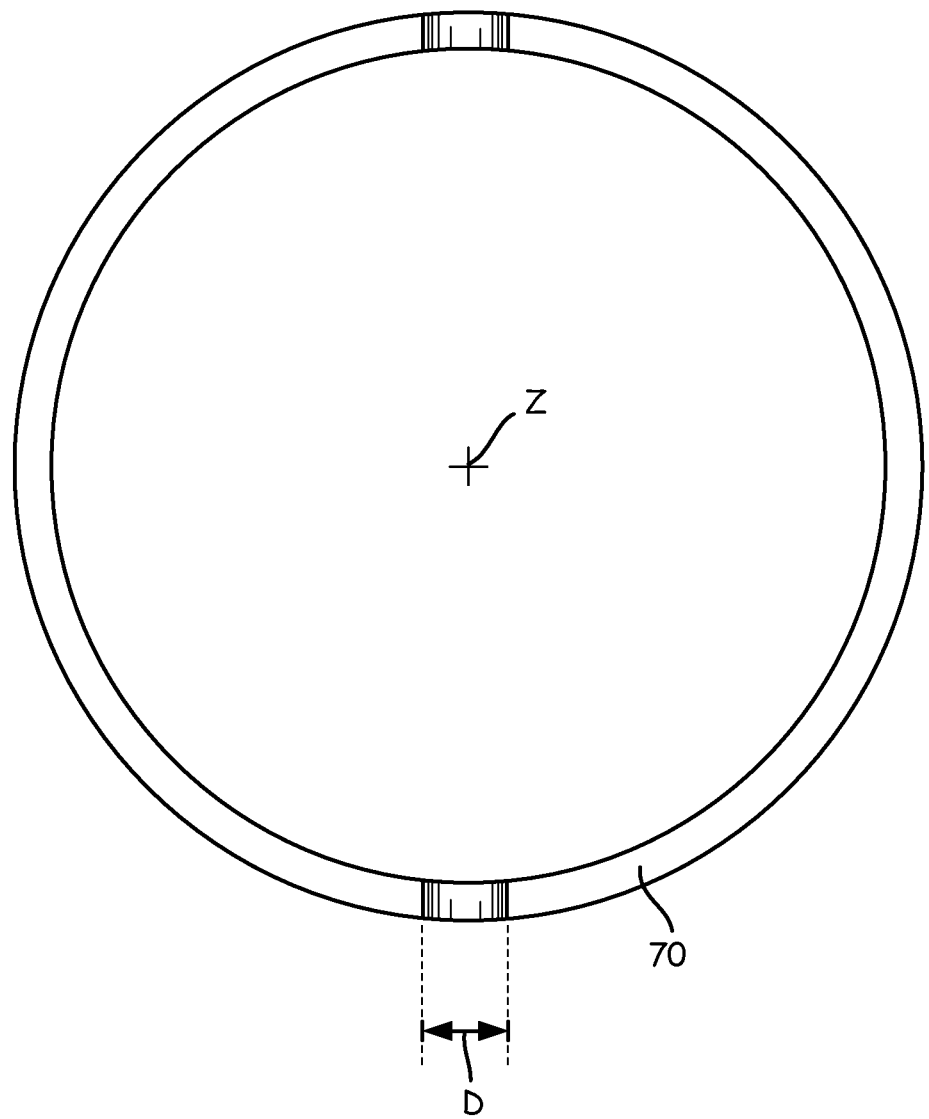
FIG. 4 is a cross-sectional view of an end of the fan housing taken along line 4-4 of FIG. 3.

FIG. 2 is a cross-sectional view of fan housing 12. FIG. 3 is a side elevation view of fan housing 12. FIG. 4 is a cross-sectional view of an end of fan housing 12 taken along line 4-4 of FIG. 3. Fan housing 12 includes outer housing portion 70, disk portion 72, inner housing portion 74, fan struts 22, ring portion 76, mounting flange 78, and drain holes 60. FIG. 3 also show axis Z.

Fan housing 12 includes outer housing portion 70. Outer housing portion 70 is a cylindrical portion that is centered on and extends axially along axis Z. A first end of outer housing portion 70 is attached to disk portion 72. Disk portion 72 extends radially inward from outer housing portion 70 to inner housing portion 74. Inner housing portion 74 is a cylindrical portion that is centered on and extends axially along axis Z. Inner housing portion 74 has a radially inner surface that abuts journal bearing 42.

Fan housing 12 also includes fan struts 22. Fan struts 22 extend between a radially outer surface of outer housing portion 70 to a radially inner surface of ring portion 76. Ring portion 76 is a cylindrical portion that is centered on and extends axially along axis Z. Mounting flange 78 is attached to a radially outer surface of ring portion 76. Mounting flange 78 is used to mount fan housing 12 in ram air fan assembly 10 by connecting mounting flange 78 between inlet housing 16 and outer housing 18.

Fan housing 12 also includes drain holes 60 in outer housing portion 70 and adjacent to a second end of outer housing portion 70. A first drain hole 60 is positioned 180 degrees away from a second drain hole 60. Drain holes 60 have a diameter D. Diameter D is between 0.1510 inches (0.3835 centimeters) and 0.1610 inches (0.4089 centimeters). Drain holes 60 are positioned adjacent a second end of outer housing portion 70. Length L extends from mounting flange 78 to a center of drain holes 60. Length L is between 6.7200 inches (17.0688 centimeters) and 6.7400 inches (17.1196 centimeters). A ratio of diameter D to length L is between 0.0224 and 0.0239.

Drain holes 60 will drain condensation out of ram air fan assembly 10 using gravity. The length L that drain holes 60 are positioned at is thus important to ensure that drain holes 60 are positioned at the radially outermost point of fan housing 12 so that condensation in fan housing 12 will run out of drain holes 60 and will not pool in fan housing 12. A typical environmental control system includes two ram air fan assemblies 10. A first ram air fan assembly 10 can be mounted in a first orientation and a second ram air fan assembly 10 can be mounted in a second orientation that is 180 degrees rotated from the first orientation. Fan housing 12 thus includes two drain holes 60 positioned 180 degrees away from one another to ensure that one of the two drain holes 60 is positioned to drain condensation out of fan housing 12.

The diameter D of drain holes 60 is likewise important. Drain holes 60 are sized large enough to ensure that condensation can drain out of drain holes 60 without drain holes 60 clogging with dust or other particulate matter. Drain holes 60 also need to be sized small enough to ensure that there is not a significant loss of cooling air flowing through fan housing 12. Cooling air flows into fan housing 12 through motor bearing cooling tube 56. This cooling air passes through inner housing 20 and bearing housing 14 before entering into fan housing 12 to cooling journal bearings 42 and motor 24. Drain holes 60 must be sized small enough so that there is no significant loss of cooling air flow so that journal bearings 42 and motor 24 can be properly cooled.

Drain holes 60 also need to be sized small enough to ensure that there is not a significant pressure drop in ram air fan assembly 10. The cooling air flowing into ram air fan assembly 10 is cooling air from an inlet of a heat exchanger in the environmental control system. The air that is flowing into the fan inlet of ram air fan assembly 10 is air that has flown through the heat exchanger in the environmental control system. As the air flows through the heat exchanger, it loses pressure. Thus, the cooling air flow in ram air fan assembly 10 is at a higher pressure than the air flowing through the fan inlet of ram air fan assembly 10. This pressure differential is what drives the cooling air through ram air fan assembly 10. Drain holes 60 must thus be sized small enough to ensure that the cooling air does not lose a significant amount of pressure across drain holes 60.

Discussion of Possible Embodiments

The following are non-exclusive descriptions of possible embodiments of the present invention.

A ram air fan housing includes an outer cylindrical housing portion centered on a central axis, with a first end and a second end positioned axially away from the first end. The ram air fan housing also includes an inner cylindrical housing portion centered on a central axis, with a first end and a second end positioned axially away from the first end.

The first end of the outer cylindrical housing portion is connected to the first end of the inner cylindrical housing portion with a disk portion. The ram air fan housing also includes a first drain hole in the outer cylindrical housing portion adjacent to the second end of the outer cylindrical housing portion.

The ram air fan housing of the preceding paragraph can optionally include, additionally and/or alternatively, any one or more of the following features, configurations and/or additional components:

A further embodiment of the ram air fan housing, and further including a cylindrical ring positioned around the outer cylindrical housing portion; a plurality of struts extending between the outer cylindrical housing portion and the cylindrical ring; and a mounting flange on a radially outer surface of the cylindrical ring.

A further embodiment of any of the forgoing ram air fan housings, wherein a diameter D is a diameter of the first drain hole, and a length L extends from the mounting flange to a center of the first drain hole.

A further embodiment of any of the forgoing ram air fan housings, wherein a ratio of the diameter D to the length L is between 0.02247 and 0.02389.

A further embodiment of any of the forgoing ram air fan housings, wherein the diameter D is between 0.1510 inches (0.3835 centimeters) and 0.1610 inches (0.4089 centimeters).

A further embodiment of any of the forgoing ram air fan housings, wherein the length L is between 6.7200 inches (17.0688 centimeters) and 6.74 inches (17.1196 centimeters).

A further embodiment of any of the forgoing ram air fan housings, and further including a second drain hole in the outer cylindrical housing portion adjacent to the second end of the outer cylindrical housing portion and 180 degrees away from the first drain hole.

A ram air fan includes a tie rod with a first end and a second end, a motor including a rotor that rotates with the tie rod and a stator positioned radially around the rotor, and journal bearings positioned between the ran housing and the tie rod. The ram air fan also includes a fan housing positioned around the tie rod with an outer housing portion and an inner housing portion connected with a disk portion, wherein there is a first drain hole in the outer housing portion.

The ram air fan of the preceding paragraph can optionally include, additionally and/or alternatively, any one or more of the following features, configurations and/or additional components:

A further embodiment of the ram air fan, wherein the fan housing further includes a cylindrical ring positioned around the outer housing portion; a plurality of struts extending between the outer housing portion and the cylindrical ring; and a mounting flange on a radially outer surface of the cylindrical ring.

A further embodiment of any of the foregoing ram air fans, wherein a diameter D is the diameter of the first drain hole, and wherein a length L extends from the mounting flange to a center of the first drain hole.

A further embodiment of any of the foregoing ram air fans, wherein a ratio of the diameter D to the length L is between 0.02247 and 0.02389.

A further embodiment of any of the foregoing ram air fans, wherein the diameter D is between 0.1510 inches (0.3835 centimeters) and 0.1610 inches (0.4089 centimeters).

A further embodiment of any of the foregoing ram air fans, wherein the length L is between 6.7200 inches (17.0688 centimeters) and 6.74 inches (17.1196 centimeters).

A further embodiment of any of the foregoing ram air fans, and further including a second drain hole in the outer housing portion of the fan housing positioned 180 degrees away from the first drain hole.

A further embodiment of any of the foregoing ram air fans, and further including a thrust shaft positioned radially around the first end of the tie rod, wherein a first journal bearing is positioned between the thrust shaft and the inner housing portion of the fan housing; a bearing housing adjacent the second end of the tie rod; a journal bearing shaft adjacent the second end of the tie rod, wherein a second journal bearing is positioned between the bearing housing and the journal bearing shaft; a fan rotor attached to the first end of the tie rod; an inlet housing surrounding the fan rotor and connected to the mounting flange of the fan housing; and an outer housing surrounding the fan housing and the connected to the mounting flange of the fan housing.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A ram air fan housing comprising:
an outer cylindrical housing portion centered on a central axis, with a first end and a second end positioned axially away from the first end;
an inner cylindrical housing portion centered on a central axis, with a first end and a second end positioned axially away from the first end, wherein the first end of the outer cylindrical housing portion and the first end of the inner cylindrical housing portion are axially aligned;
a disk portion connecting the first end of the outer cylindrical housing portion to the first end of the inner cylindrical housing portion, wherein the outer cylindrical housing portion is connected to a radially outer edge of the disk portion and the inner cylindrical housing portion is connected to a radially inner edge of the disk portion; and
a first drain hole in the outer cylindrical housing portion adjacent to the second end of the outer cylindrical housing portion.

2. The ram air fan housing of claim 1, and further comprising:
a cylindrical ring positioned around the outer cylindrical housing portion;
a plurality of struts extending between the outer cylindrical housing portion and the cylindrical ring; and
a mounting flange on a radially outer surface of the cylindrical ring.

3. The ram air fan housing of claim 2, wherein a diameter D is a diameter of the first drain hole, and a length L extends from the mounting flange to a center of the first drain hole.

4. The ram air fan housing of claim 3, wherein a ratio of the diameter D to the length L is between 0.02247 and 0.02389.

5. The ram air fan housing of claim 3, wherein the diameter D is between 0.1510 inches (0.3835 centimeters) and 0.1610 inches (0.4089 centimeters).

6. The ram air fan housing of claim 3, wherein the length L is between 6.7200 inches (17.0688 centimeters) and 6.74 inches (17.1196 centimeters).

7. The ram air fan housing of claim 1, and further comprising:
a second drain hole in the outer cylindrical housing portion adjacent to the second end of the outer cylindrical housing portion and 180 degrees away from the first drain hole.

8. A ram air fan comprising:
a tie rod with a first end and a second end;
a motor including a rotor that rotates with the tie rod and a stator positioned radially around the rotor;
a fan housing positioned around the tie rod with an outer housing portion with a first end and a second end positioned axially away from the first end, and an inner housing portion with a first end and a second end positioned axially away from the first end, wherein the first end of the outer housing portion and the first end of the inner housing portion are axially aligned and connected with a disk portion, wherein the outer housing portion is connected to a radially outer edge of the disk portion and the inner housing portion is connected to a radially inner edge of the disk portion, and wherein there is a first drain hole in the outer housing portion adjacent to the second end of the outer housing portion; and
journal bearings positioned between the fan housing and the tie rod.

9. The ram air fan of claim 8, wherein the fan housing further comprises:
a cylindrical ring positioned around the outer housing portion;
a plurality of struts extending between the outer housing portion and the cylindrical ring; and
a mounting flange on a radially outer surface of the cylindrical ring.

10. The ram air fan of claim 9, wherein a diameter D is the diameter of the first drain hole, and wherein a length L extends from the mounting flange to a center of the first drain hole.

11. The ram air fan of claim 10, wherein a ratio of the diameter D to the length L is between 0.02247 and 0.02389.

12. The ram air fan of claim 10, wherein the diameter D is between 0.1510 inches (0.3835centimeters) and 0.1610 inches (0.4089 centimeters).

13. The ram air fan of claim 10, wherein the length L is between 6.7200 inches (17.0688centimeters) and 6.74 inches (17.1196 centimeters).

14. The ram air fan of claim 9, and further comprising:
a second drain hole in the outer housing portion of the fan housing positioned 180degrees away from the first drain hole.

15. The ram air fan of claim 9, and further comprising:
a thrust shaft positioned radially around the first end of the tie rod, wherein a first journal bearing is positioned between the thrust shaft and the inner housing portion of the fan housing;
a bearing housing adjacent the second end of the tie rod;
a journal bearing shaft adjacent the second end of the tie rod, wherein a second journal bearing is positioned between the bearing housing and the journal bearing shaft;
a fan rotor attached to the first end of the tie rod;
an inlet housing surrounding the fan rotor and connected to the mounting flange of the fan housing; and
an outer housing surrounding the fan housing and connected to the mounting flange of the fan housing.

* * * * *